Aug. 4, 1936.        G. A. LYON        2,049,456
SHOVE DOWN TIRE COVER
Filed Jan. 2, 1932        2 Sheets-Sheet 1
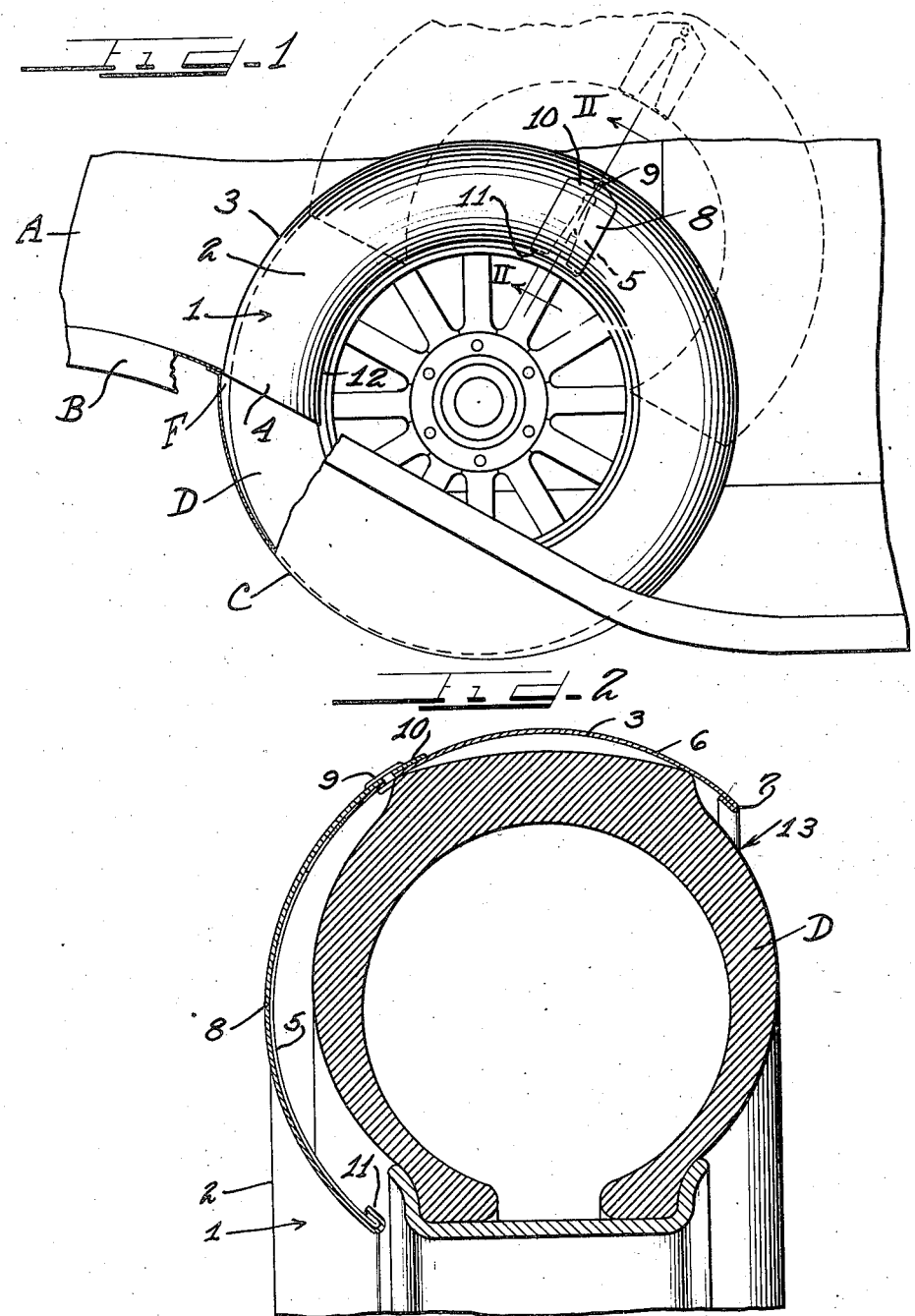
Inventor
George Albert Lyon.
by Charles Hill
Attys.

Aug. 4, 1936.    G. A. LYON    2,049,456
SHOVE DOWN TIRE COVER
Filed Jan. 2, 1932    2 Sheets-Sheet 2
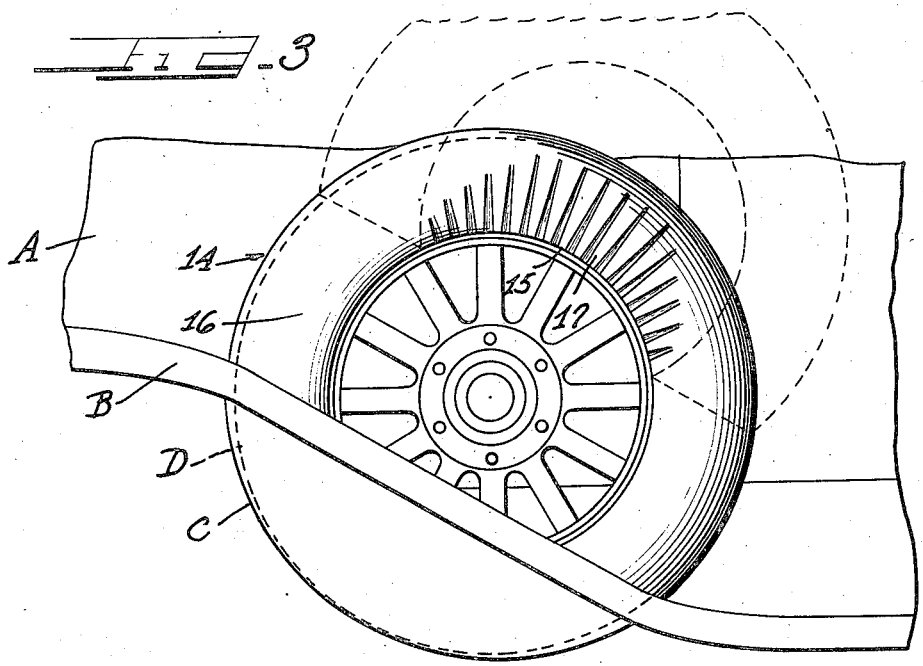
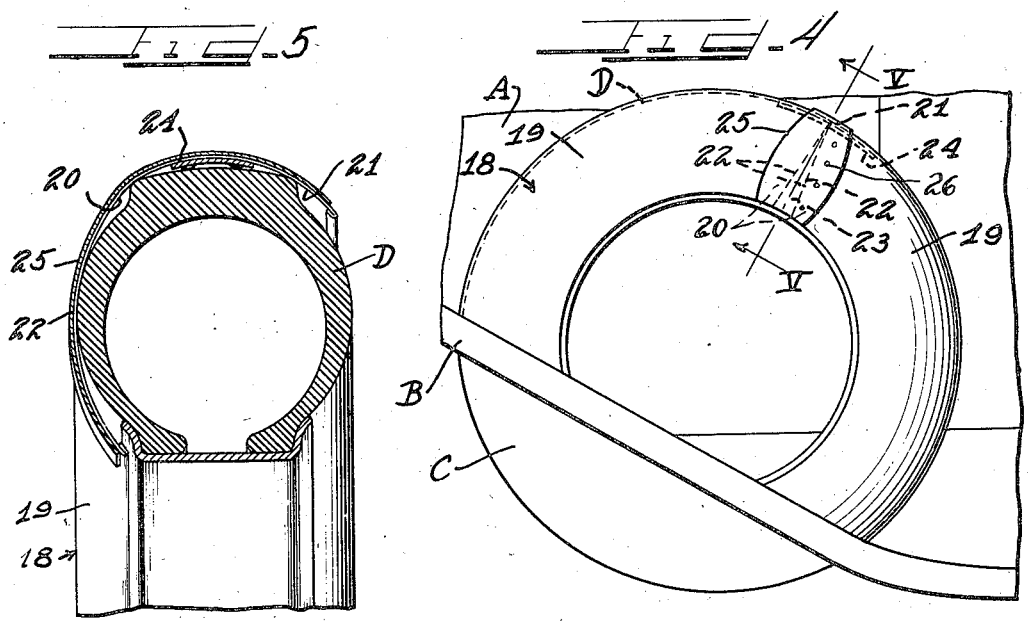
Inventor
George Albert Lyon.

Patented Aug. 4, 1936

2,049,456

UNITED STATES PATENT OFFICE 2,049,456

SHOVE DOWN TIRE COVER

George Albert Lyon, Allenhurst, N. J., assignor to Lyon Incorporated, Asbury Park, N. J., a corporation of Delaware Application January 2, 1932, Serial No. 584,554

4 Claims. (Cl. 150—54)

This invention has to do with tire covers for automobiles and has to do more particularly with tire covers of the unitary type, adapted for cooperation with the fenderwells of automobiles to properly enclose and protect spare tires, although capable of individual use for covering spare tires which may be carried at the rear of automobiles.

It is one of the objects of this invention to provide an improved, simple and inexpensive cover of a unitary construction capable of being mounted on a spare tire with a minimum of effort on the part of the person applying the same.

It is another object of the invention to provide a unitary tire cover of such construction that it may be readily mounted upon a spare tire of an automobile by a shove down action in substantially the plane of the tire to be covered, and of such a character as to retain itself on the tire once it is properly positioned thereon.

A further object of the invention resides in the provision of a unitary tire cover constructed to protect a spare tire carried in the fenderwell of an automobile so that the ends of the cover when in proper position on the tire are located at the mouth of the well to cooperate with the latter in covering the tire.

Another object of the invention resides in the provision of a unitary tire cover of such construction that it is inherently expansible, allowing the same to be expanded sufficiently so that it may be applied to and removed from a spare tire carried in a fenderwell with substantially a single movement in each case in substantially the plane of the tire, and which is inherently contractible to resiliently hold itself on the tire.

In accordance with the general features of the invention, I provide a preferably sheet metal tire covering comprising side and peripheral portions arranged so that the side portion may cover the outer side wall of a spare tire carried by an automobile and the peripheral portion may extend over the tread of the tire, said portions being split transversely to provide relatively movable ends. The cover having its portions diametrically opposite the split is so constructed as to permit a spreading of the ends of the cover portions to permit the ends of the peripheral portions to move in the plane of the tire past the tread of the tire and thereafter allowed to contract, either for the purpose of applying the cover to a tire or for removing the same from the tire.

The portion of the tire diametrically opposite the split is, in accordance with one form of the invention, such that the same is divided in substantially equal parts, forming a substantially V-shaped space between adjacent parts of the side covering portions of the tire to allow relative movement thereof, the adjacent peripheral portions being connected through a strap which is sufficiently resilient to normally hold the entire cover in engagement with the spare tire but will allow expansion of the cover to allow the same to be applied to and removed from the spare tire.

A second form of the invention is so constructed that the middle part of the cover has a split extending across the side portion only of the cover, thus allowing for the desired expansion of the cover.

A further form of the invention is so constructed that it is continuous from end to end but the middle part of the side portion is corrugated or otherwise constructed to allow the cover to contract and expand.

Other forms of construction for this purpose are contemplated, those hereinbefore and hereinafter specifically described being merely examples of the various forms in which the invention may be embodied.

Further objects and advantages of the invention will appear as the description proceeds.

This invention (in a preferred form) is illustrated in the drawings and hereinafter more fully described.

On the drawings

Figure 1 is a fragmentary elevational view showing one form of tire cover constructed in accordance with the present invention and applied to a spare tire cover in an automobile fenderwell, certain parts being shown in section.

Figure 2 is an enlarged fragmentary sectional view taken approximately in the plane indicated by the line II—II in Figure 1.

Figures 3 and 4 are views similar to Figure 1, but showing modified forms of the invention.

Figure 5 is an enlarged fragmentary sectional view taken approximately in the plane indicated by the line V—V of Figure 4.

Referring now more particularly to the drawings, wherein the same parts are designated throughout by the same reference characters, one form of the invention is shown in Figures 1 and 2, and is illustrated in connection with the body A of an automobile having a fender B provided with a well C in which a spare tire D is received. The tire cover itself comprises a preferably sheet metal arcuate member 1 having a side portion 2 for covering a side wall of the spare tire and a rim or peripheral portion 3 for covering a tread portion of the tire. The length of the cover 1 is such that when positioned on a spare tire carried in the fenderwell as shown in Figure 1, the ends 4 are positioned at the mouth F of the well. Thus, when the cover is in position as shown in Figure 1, the ends 4 are substantially concealed by the fender B and have the appearance of being integral with the latter, thereby materially enhancing the appearance of the automobile in connection with which this tire cover is used.

The tire cover 1 may have any suitable shape in cross section, but preferably is given an arcuate shape to simulate to some extent the transverse contour of the tire. In order to permit the cover to be flexed so that the same may be expanded to allow the same to be applied to and removed from the tire D, a substantially V-shaped cut 5 is made in the side portion 2 substantially equidistant from the ends 4. The tread covering portion 3 is continuous, however, and is thus permitted to flex by a hinge or pivot action about the portion 6 extending from the cut 5 transversely of the tread covering portion 3.

The free longitudinal margin 7 of the tread covering portion 3 extends radially inwardly of the tread of the tire when in proper tire protecting position as shown in Figure 2, and the cover 1 is so constructed that when in proper tire protecting position it firmly engages the tread of the tire and holds itself resiliently in that position. The cut 5 is concealed by a plate 8 which is secured to the cover 1 at 9 adjacent one end and has its other end return bent at 11 about the inner peripheral margin 12 of the tire cover 1. The plate 8 preferably conforms to the side portion 2 of the tire cover as shown, and there is preferably sufficient clearance between its return bent portion 11 and the corresponding margin at 12 of the tire cover to allow the desired pivotal action of the ends 4 of the cover about the intermediate portion 6 thereof.

With the cover in proper tire protecting position on a spare tire carried in the fenderwell C, the task of removal of the cover is extremely simple since it requires merely that the fingers of the hands grasp spaced portions of the margin 7, this being possible in view of the space 13 between the latter and the tire D, exerting a separative force to cause the ends 4 to move outwardly in a pivotal action about the portion 6 of the tread covering portion 3, and moving the whole cover upwardly in its plane as shown by the dotted lines in Figure 1 until the cover is entirely free of the tire. Obviously, the reverse operation is required to replace the cover on the tire.

It will be noted that the ends 4 of the cover are so positioned respecting the mouth F of the well C that the well will not interfere with the spreading or contracting movement of said ends. Moreover, if desired, suitable ornamentation may be applied to the plate 8 to further enhance the appearance of the automobile in connection with which this tire cover is used. It will be appreciated in view of the foregoing that the tire may be applied to or removed from the cover with substantially a single movement in substantially the plane of the tire, and that the application and removal of the cover may be effected without in any way disturbing the tire in the well. It will be noted further that the ends 4 of the cover are cut so that they lie in substantially the same plane which is parallel with the mouth F of the well when the cover is in proper position as shown in Figure 1.

In the form of the invention shown in Figure 3, the cover 14, instead of being cut as is the case with the form of the invention shown in Figures 1 and 2, has the corresponding intermediate portion 15 of its side covering portion 16 corrugated at 17 so that the cover as a whole may be flexed in its own plane about said corrugated portion, in much the same way in which the cover 1 in the form of the invention above described is flexed. The cover 14 is in all other respects substantially identical with that above described, both in construction, the manner in which it cooperates with the fenderwell C, and the operation required to apply and remove the same.

The form of the invention illustrated in Figures 4 and 5 differs from those previously described only in respect to the construction of its intermediate portion by which it is made capable of expanding and contracting to enable the same to be applied to and removed from a spare tire. In this form, the cover 18 consists of a plurality of individual sections 19, preferably two, as shown. The parts 19 are preferably of substantially equal length and have their juxtaposed ends 20 so constructed that the tread covering portions 21 of said ends are in substantial engagement while their side portions 22 are spaced apart to provide a substantially V-shaped space 23. The meeting edges 21 of the tread covering portion of the cover are so arranged as not to interfere with each other during the expansion and contraction of the cover, this action being provided for by a resilient strap 24 bridging the portions 21 and preferably permanently connected to the portions by any suitable means such as rivets, spot-welding or the like. The sections 19 may therefore be constructed of substantially rigid sheet metal or other suitable material.

The end portions 20 of the sections 19 are preferably concealed and to this end a plate 25 is provided. The latter is preferably secured permanently to one end 20 and is of a length substantially commensurate with the transverse extent of the cover as shown in Figure 5. The plate 25 preferably closely embraces the ends 20, but sufficient clearance is provided to permit the sections 19 to be spread the desired degree without injury to either section or the plate 25.

The transverse curvature of the rim covering portion of the cover 18 is such as to provide a space between the same and the tread of the tire when the cover is in proper tire protecting position, as shown in Figure 5, and in this space the connecting and pivot plate or strap 24 is received.

It will be seen from the foregoing that I have provided a tire cover which may be embodied in a plurality of forms, three of which are given herein for illustrative purposes only the cover being of such construction that it is readily applicable to and removable from a spare tire carried in the fenderwell without in the least disturbing the tire in the well. In other words, it is not necessary to remove the tire when it is desired to apply or remove the cover. In addition, the cover herein described is of the shove down character, that is, it is applied to the spare tire in the well by shoving the same in its own plane and the plane of the tire onto the tire in proper protecting position with substantially a single movement.

It will be seen that by reason of the fewness of parts, the tire cover embodying the instant invention may be constructed in a minimum of operations and at a low cost.

I am aware that many changes may be made and numerous details of construction may be varied through a wide range without departing from the principles of this invention, and I therefore do not purpose limiting the patent granted hereon otherwise than is necessitated by the prior art.

I claim as my invention:

1. In combination with an automobile fenderwell in which a spare tire is carried, a split ring having relatively movable ends and comprising a side portion and a rim portion for covering respectively the side wall and tread portions of the tire, the side portion of the cover intermediate its ends being corrugated to permit of said pivotal movement in the plane of the ring to such an extent as to enable said ends to be separated sufficiently to pass by diametrically opposite points on the tread of the tire when the ring is shoved in the plane of the tire into and out of proper tire protecting position, whereby the ring may be applied to the tire in proper tire protecting position by a movement in the plane of the tire without disturbing the latter in the well.

2. A shove down cover for a spare tire carried in a fender well including an arcuate member of slightly more than 180° extent to cover the part of the tire exposed when the tire is in the well, said member comprising tire tread and side covering portions in which a section thereof is pivotally movable with reference to the remainder of the member in the plane of the member to such an extent as to enable the ends of the member to be separated sufficiently to pass by diametrically opposite points on the tread when the cover member is shoved in the plane of the tire into and out of proper tire protecting position, said pivotal movement being provided by so forming a part of the side covering portion between its ends as to increase the flexibility of the member at said part, said tread covering portion being circumferentially continuous and extending laterally over the tread, the ends of the member being pivotable about an intermediate section of the tread covering portion by reason of the formation of said side covering portion.

3. A shove down cover for a spare tire carried in a fender well, including an arcuate member of slightly more than 180° extent to cover the part of the tire exposed when the tire is in the well, said member comprising tire tread and side covering portions in which a section thereof is pivotally movable with reference to the remainder of the member in the plane of the member to such an extent as to enable the ends of the member to be separated sufficiently to pass by diametrically opposite points on the tread when the cover member is shoved in the plane of the tire into and out of proper tire protecting position, said pivotal movement being provided by a slot in the side covering portion between the ends of the member to increase the flexibility of the member, said member being formed so that its free ends yieldably hug the tire tread below the upper half of the tire, said tread covering portion being circumferentially continuous and extending laterally over the tread, the ends of the member being pivotable about an intermediate section of the tread covering portion by reason of the formation of said side covering portion.

4. A shove down cover for a spare tire carried in a fender well, including an arcuate member of slightly more than 180° extent to cover the part of the tire exposed when the tire is in the well, said member comprising tire tread and side covering portions in which a section thereof is pivotally movable with reference to the remainder of the member in the plane of the member to such an extent as to enable the ends of the member to be separated sufficiently to pass by diametrically opposite points on the tread when the cover member is shoved in the plane of the tire into and out of proper tire protecting position, said pivotal movement being provided by a slot substantially only in the side covering portion between the ends of the member to increase the flexibility of the member, said member being formed so that its free ends yieldably hug the tire tread below the upper path of the tire, said tread covering portion being circumferentially continuous and extending laterally over the tread, the ends of the member being pivotable about an intermediate section of the tread covering portion by reason of the formation of said side covering portion.

GEORGE ALBERT LYON.